Nov. 15, 1932.  E. M. SHANNON  1,888,183
LOCOMOTIVE TRAILER TRUCK
Filed March 16, 1931  2 Sheets-Sheet 1
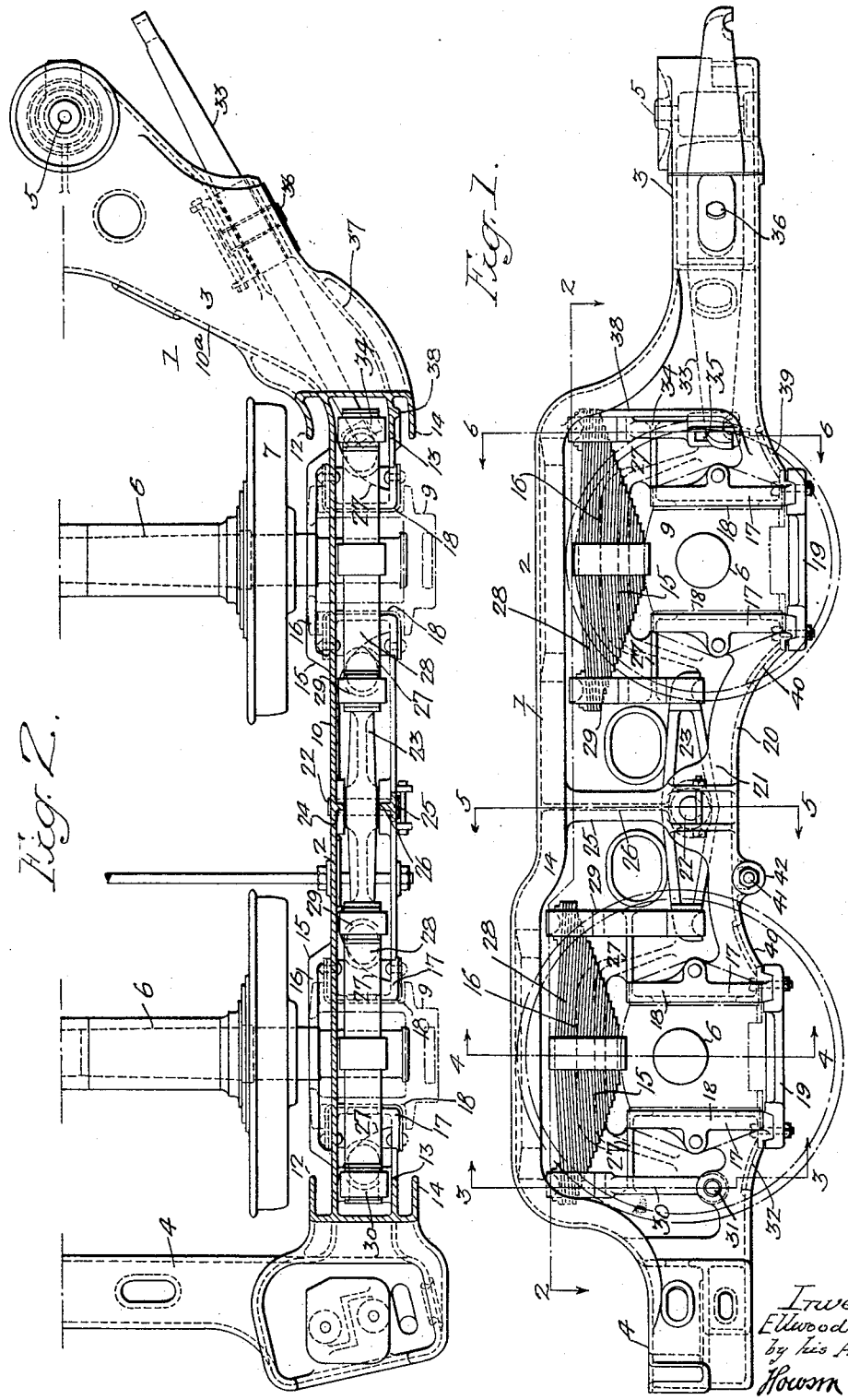

Nov. 15, 1932.  E. M. SHANNON  1,888,183
LOCOMOTIVE TRAILER TRUCK
Filed March 16, 1931   2 Sheets-Sheet 2
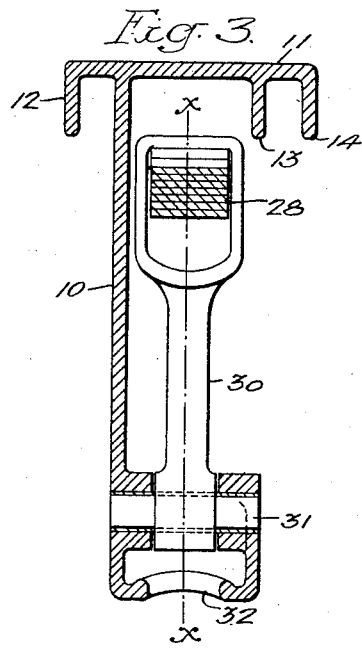
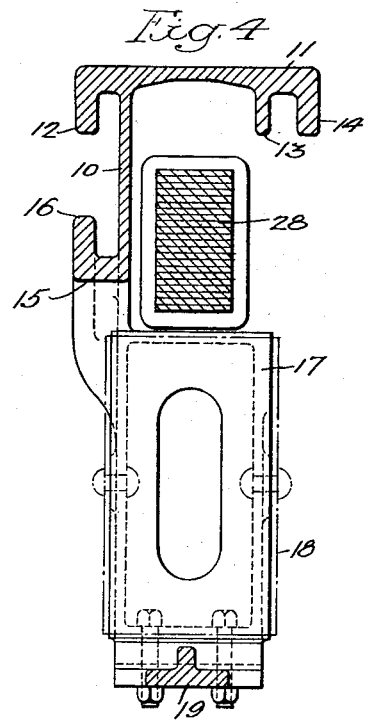
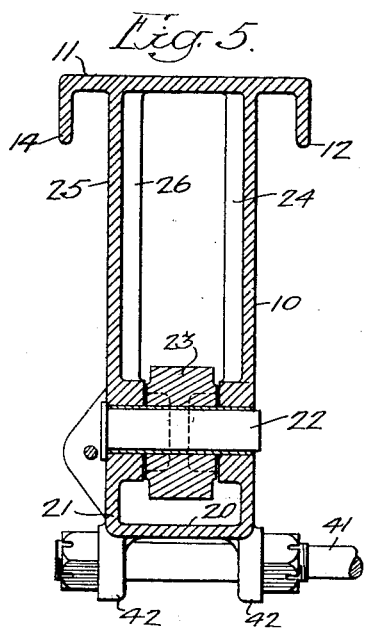
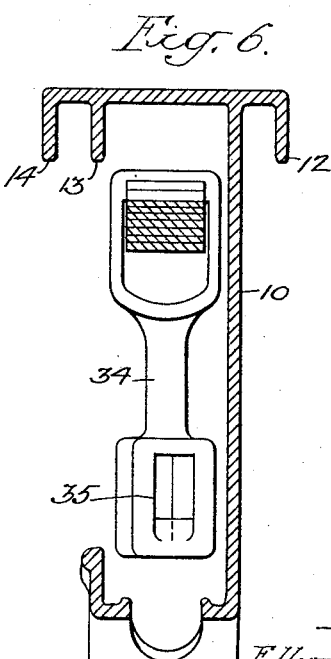
Inventor:
Ellwood M. Shannon,
by his Attorneys.
Howson & Howson Patented Nov. 15, 1932

1,888,183

UNITED STATES PATENT OFFICE

ELLWOOD M. SHANNON, OF BALA, PENNSYLVANIA

LOCOMOTIVE TRAILER TRUCK

Application filed March 16, 1931. Serial No. 523,096.

My invention relates to certain improvements in the trailer trucks of locomotives, in which the equalizing mechanism is arranged on the outside of the vertical webs of the side members of the truck.

The invention also relates to certain details of construction which will be fully described hereinafter.

This application is a companion to that filed by Messrs. Keen and Shannon on the 16th day of March, 1931, under Serial No. 523,074, issued as Patent No. 1,831,711, November 10, 1931.

In the accompanying drawings:

Fig. 1 is a side view of a locomotive trailer truck illustrating my invention;

Fig. 2 is a sectional plan view of one side of the truck, on the line 2—2, Fig. 1;

Fig. 3 is a sectional view on the line 3—3, Fig. 1;

Fig. 4 is a sectional view on the line 4—4, Fig. 1;

Fig. 5 is a sectional view on the line 5—5, Fig. 1; and

Fig. 6 is a sectional view on the line 6—6, Fig. 1.

1 is the frame of the truck, having side members 2 and transverse end members 3 and 4, the end member 3 being in the form of a radius bar and having an opening 5 for the pivot pin of the truck. 6 are the axles of the truck and 7 are the wheels. The side frames and the end frames of the truck are in the present instance made in a single casting, but it will be understood that in some instances the end frames may be separate and secured to the side frames.

Each side frame has a deep web 10 located at one side of the longitudinal center line $x$ of the frame, as shown in the sectional view Fig. 3. The web has openings therein for the axle boxes and has other openings to lighten the structure. At the upper end of the web is a cross-member 11 having downwardly projecting flanges 12, 13 and 14, which add materially to the strength of the frame, and directly above the boxes the flanges 12 and 14 are increased in thickness, as shown in Fig. 4, and an integral frame 15 extends over the box opening and has an upwardly extending flange 16, as shown in Fig. 4.

The pedestals 17 of the boxes project outwardly from the web, as shown in Fig. 4, and have the pedestal wear plates 18 secured thereto. To reinforce the pedestals at the upper end, horizontal fillets 27 are provided which extend from the web 10 to the outer ends of each pedestal. The pedestals are tied together by bars 19, which are secured to the lower ends of the pedestals by bolts as shown. The lower portion of the frame between the two sets of pedestals is U-shape in form and consists of a lower cross member 20 and a flange 21, which is spaced the same distance from the longitudinal center of the frame as the web 10, see Fig. 5.

In the web 10 and in the flange 21 are the bearings for the fulcrum pin 22 for the equalizing lever 23, and in order to reinforce this portion of the truck frame, a vertical rib 24 is formed on the outer side of the web 10, and an integral bar 25 having a rib 26 extends from the bearing of the fulcrum pin to the top member 11 of the frame. This is clearly shown in Figs. 1 and 5. At each side of the bar 25 the frame is open, so that the equalizing beam can be readily removed and replaced when necessary.

Mounted above each axle box 9 is a semi-elliptical spring 28. The ends of the equalizing bar are connected to the two springs by links 29, and the rear end of the rear spring 28 is connected to the frame by a link 30, which is pivotally mounted on a pin 31, having its bearings in the lower portion of the frame. This portion of the side frame is made U-shape in form, as clearly shown in Fig. 3 and has an opening 32. The forward end of the forward spring 28 is connected to an angularly arranged equalizing lever 33 by a link 34, Fig. 6. This link has a socket 35 at its lower end, to receive the rear end of the equalizing lever 33, which is mounted on the fulcrum pin 36. The outer end of the equalizing beam 33 is shaped to connect with the main equalizing mechanism of the locomotive.

It will be noticed that the vertical web 10 of each side frame is continued at the end member 3 and forms the inner web 10a of said end member. The outer web of this end member 3 is formed by a web 37, which terminates at 38 a distance in advance of the first pedestal, so that the link 34 can be readily removed. This construction materially strengthens the radius end member 3.

In the bottom cross-member, directly under the link 34, is an opening 39, and there are also openings 40 in the bottom cross-member between the pedestal openings. I preferably connect the two side frames by a cross bar 41, which extends through lugs 42 depending from the lower cross-member at one side of the fulcrum of the equalizing lever 23.

I claim:

1. The combination in a locomotive trailer truck, of an integral truck frame having side members and transverse members connecting the side members; axle box openings in the side frame; pedestals on each side of the openings, formed integral with the frame, the frame having a vertical deep web extending from one end of the side frame to the other and at the inner side of the longitudinal center line of the side frame; the pedestals projecting outwardly from the web; and equalizing mechanism consisting of an equalizing lever, springs and links located at the longitudinal center of the truck frame and on the outside of the vertical web, so that access may be had to the equalizing mechanism and the axle boxes from the outside of the truck.

2. The combination in a locomotive trailer truck, of a frame having side members, each side member having axle box openings; a deep vertical web extending from one end of each side member to the opposite end thereof, said web being at the inner side of the longitudinal center of the side member; outwardly projecting pedestals at each side of the axle box openings; an upper cross-member integral with the vertical web and extending beyond the longitudinal center line of the side member; a lower cross-member extending from the lower end of the vertical web beyond the longitudinal center line of the side member; and equalizing mechanism consisting of a pivotally mounted equalizing beam, semi-elliptical springs resting upon the axle boxes within the axle box openings and links, the said mechanism being located on the longitudinal center line of the side member, adjacent to the vertical web and under the upper cross member and above the lower cross member, the entire equalizing mechanism at each side of the truck being exposed to view and accessible from the outer side of the truck.

3. The combination in a locomotive trailer truck, of a main frame having side members, each side member having a deep vertical web located at one side of the longitudinal center line of the side member and having axle box openings; a pedestal at each side of the axle box openings, said pedestals projecting outwardly from the web, the web having an integral frame extending over the axle box openings to reinforce the web at this point; and a top cross member formed integral with the web and extending beyond the longitudinal center line of the frame and having depending flanges.

4. The combination in a locomotive trailer truck, of a main frame having side members, each side member having a deep vertical web located at one side of the longitudinal center line of the side member and having axle box openings; a pedestal at each side of the axle box openings, said pedestals projecting outwardly from the web, the web having an integral frame extending over the axle box openings to reinforce the web at this point; a top cross-member formed integral with the web and extending beyond the longitudinal center line of the frame and having depending flanges, the web having lower cross members between the axle box openings and beyond the axle box openings, these cross-members having upturned flanges; and equalizing mechanism located on the longitudinal center line of the side member of the truck, the equalizing lever of the said mechanism being mounted on a fulcrum pin having its bearings in the vertical web and the upwardly extending portion of the lower cross-member.

5. The combination in a locomotive trailer truck, of a main frame having side members, each side member having a deep vertical web located at one side of the longitudinal center line of the side member and having axle box openings; a pedestal at each side of the axle box openings, said pedestals projecting outwardly from the web, the web having an integral frame extending over the axle box openings to reinforce the web at this point; a top cross-member formed integral with the web and extending beyond the longitudinal center line of the frame and having depending flanges, the web having lower cross-members between the axle box openings and beyond the axle box openings, these cross-members having upturned flanges; equalizing mechanism located on the longitudinal center line of the side member of the truck, the equalizing lever of the said mechanism having a fulcrum pin on which the lever is mounted, the pin having its bearings in the vertical web and the upwardly extending portion of the lower cross-member; and an integral bar connecting the upper cross-member with the lower cross-member at the fulcrum bearing for the equalizing lever.

6. The combination in a locomotive trailer truck, of side members, each side member having a vertical web located on the inner side of the longitudinal center line of the side member; axle box openings in the web, the web being reinforced above the openings; pedestals projecting outwardly from the web; an upper cross bar integral with the web and extending outwardly beyond the center line of the frame; a lower cross-member extending outwardly from the lower end of the web and connecting the two pedestals, the lower cross-member having a vertical flange at its outer end, the flange being extended to form a bearing; a fulcrum pin mounted in the bearing and in a bearing in the web; an equalizing lever mounted on the fulcrum pin; semi-elliptical springs mounted upon the axle boxes within the axle box openings; and links connecting the springs with the equalizing lever and with the frame at one end and with an angularly disposed equalizing beam at the opposite end, the said equalizing mechanism being on the longitudinal center line of the frame and on the outer side of the vertical web.

7. The combination in a locomotive trailer truck, of a frame having integral side members and an integral cross-member forming a radius bar; a vertical web extending the full length of the side members of the frame, on the inner side of the longitudinal center line thereof, said web being continued to form the inner wall of a hollow end member; a web forming the outer wall thereof; an equalizing lever at each side of the truck arranged at an angle and partly located in the hollow cross-member; a fulcrum pin in said member, on which the lever is mounted, the outer wall of the hollow member extending from the side member to and forming the outer bearing of the fulcrum pin; and equalizing mechanism on each side member of the truck, said equalizing mechanism at each side of the truck being arranged on the longitudinal center line of the side frame and on the outer side of the vertical web, and connected to the angular equalizing lever located in the hollow end member.

ELLWOOD M. SHANNON.